(12) United States Patent
Kang et al.

(10) Patent No.: US 8,693,590 B2
(45) Date of Patent: Apr. 8, 2014

(54) JOINT SPECIAL BURST AND TRANSPORT FORMAT COMBINATION INDEX (TFCI) DETECTION

(75) Inventors: Insung Kang, San Diego, CA (US); Hari Sankar, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 13/477,957

(22) Filed: May 22, 2012

(65) Prior Publication Data

US 2013/0235958 A1    Sep. 12, 2013

Related U.S. Application Data

(60) Provisional application No. 61/609,160, filed on Mar. 9, 2012.

(51) Int. Cl.
*H03D 1/00* (2006.01)
(52) U.S. Cl.
USPC ........... 375/343; 375/144; 375/146; 375/225; 375/260
(58) Field of Classification Search
USPC .......... 375/343, 144, 146, 225, 260; 370/235, 370/311, 336, 337
See application file for complete search history.

(56) References Cited

U.S. PATENT DOCUMENTS

| 2007/0047499 A1* | 3/2007 | Montojo et al. ............... 370/335 |
| 2009/0196263 A1* | 8/2009 | DiFazio et al. ............... 370/336 |
| 2009/0274084 A1 | 11/2009 | Terry et al. |
| 2011/0019727 A1 | 1/2011 | Catreux-Erceg et al. |
| 2011/0280346 A1 | 11/2011 | Yang et al. |
| 2012/0028633 A1 | 2/2012 | Bhattacharjee et al. |

FOREIGN PATENT DOCUMENTS

| EP | 1876723 A2 | 1/2008 |
| WO | 2004012348 A2 | 2/2004 |

OTHER PUBLICATIONS

International Search Report and Written Opinion—PCT/US2013/030015—ISA/EPO—Jun. 24, 2013.
Valtanen, J., "Transport Formats in UMTS Radio Network Controller's Software Implementation," Helsinki Univ. of Tech., Masters Thesis, Jan. 7, 2008.

* cited by examiner

*Primary Examiner* — Dhaval Patel
(74) *Attorney, Agent, or Firm* — Kristine U. Ekwueme

(57) ABSTRACT

To detect a special burst sequence, a cross correlation (C) is compared to a square root of an estimated noise variance ($\sigma$) in conjunction with a threshold value (Th). In one aspect of the disclosure, the threshold value may include multiple threshold values. The multiple threshold values may be compared to an intensity or level of a special burst metric (C/$\sigma$) to facilitate determination of the special burst sequence. For example, when a special burst metric C/$\sigma$ is greater than a second threshold value (Th2) it may be determined that a special burst sequence exists. However, when the special burst metric C/$\sigma$ is greater than a first threshold value (Th1), but less than the second threshold metric (Th2), it may be determined that detection of a special burst is unclear. In this case, a TFCI value may be used to confirm whether a special burst is detected.

20 Claims, 7 Drawing Sheets

JOINT SPECIAL BURST AND TRANSPORT FORMAT COMBINATION INDEX (TFCI) DETECTION

CROSS-REFERENCE TO RELATED APPLICATION

This application claims priority to U.S. Provisional Patent Application No. 61/609,160, entitled, JOINT SPECIAL BURST AND TRANSPORT FORMAT COMBINATION INDEX (TFCI) DETECTION, filed on Mar. 9, 2012, in the names of KANG, et al., the disclosure of which is expressly incorporated by reference herein in its entirety.

BACKGROUND

1. Field

Aspects of the present disclosure relate generally to wireless communication systems, and more particularly, to a joint special burst and transport format combination index (TFCI) detection.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes determining whether a potential special burst is decoded with a first degree of certainty. The method may also include determining whether a transport format combination index (TFCI) value is zero when the potential special burst is not decoded with the first degree of certainty but is decoded with a second, lower degree of certainty. The method may also include deciding the potential special burst is a special burst when either the potential special burst is decoded with the first degree of certainty or when the potential special burst is decoded with the second, lower degree of certainty and also the TFCI value is determined to be zero.

According to another aspect of the present disclosure, an apparatus for wireless communication includes means for determining whether a potential special burst is decoded with a first degree of certainty. The apparatus may also include means for determining whether a transport format combination index (TFCI) value is zero when the potential special burst is not decoded with the first degree of certainty but is decoded with a second, lower degree of certainty. The apparatus may also include means for deciding the potential special burst is a special burst when either the potential special burst is decoded with the first degree of certainty or when the potential special burst is decoded with the second, lower degree of certainty and also the TFCI value is determined to be zero.

According to one aspect of the present disclosure, a computer program product for wireless communication in a wireless network includes a computer readable medium having non-transitory program code recorded thereon. The program code includes program code to determine whether a potential special burst is decoded with a first degree of certainty. The program code also includes program code to determine whether a transport format combination index (TFCI) value is zero when the potential special burst is not decoded with the first degree of certainty but is decoded with a second, lower degree of certainty. The program code also includes program code to decide the potential special burst is a special burst when either the potential special burst is decoded with the first degree of certainty or when the potential special burst is decoded with the second, lower degree of certainty and also the TFCI value is determined to be zero.

According to one aspect of the present disclosure, an apparatus for wireless communication includes a memory and one or more processors coupled to the memory. The processor(s) is configured to determine whether a potential special burst is decoded with a first degree of certainty. The processor(s) is further configured to determine whether a transport format combination index (TFCI) value is zero when the potential special burst is not decoded with the first degree of certainty but is decoded with a second, lower degree of certainty. The processor(s) is further configured to decide the potential special burst is a special burst when either the potential special burst is decoded with the first degree of certainty or when the potential special burst is decoded with the second, lower degree of certainty and also the TFCI value is determined to be zero.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
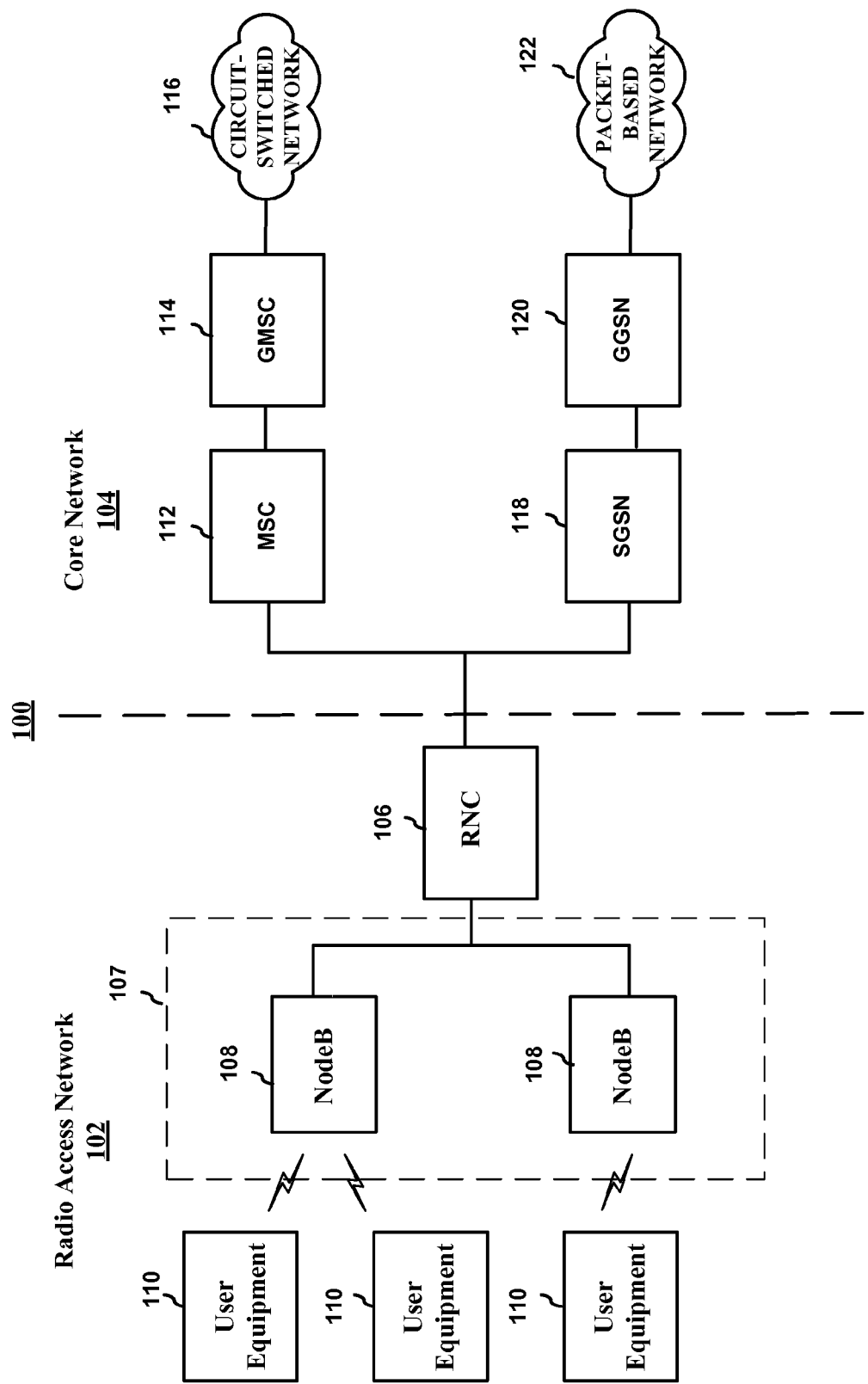
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
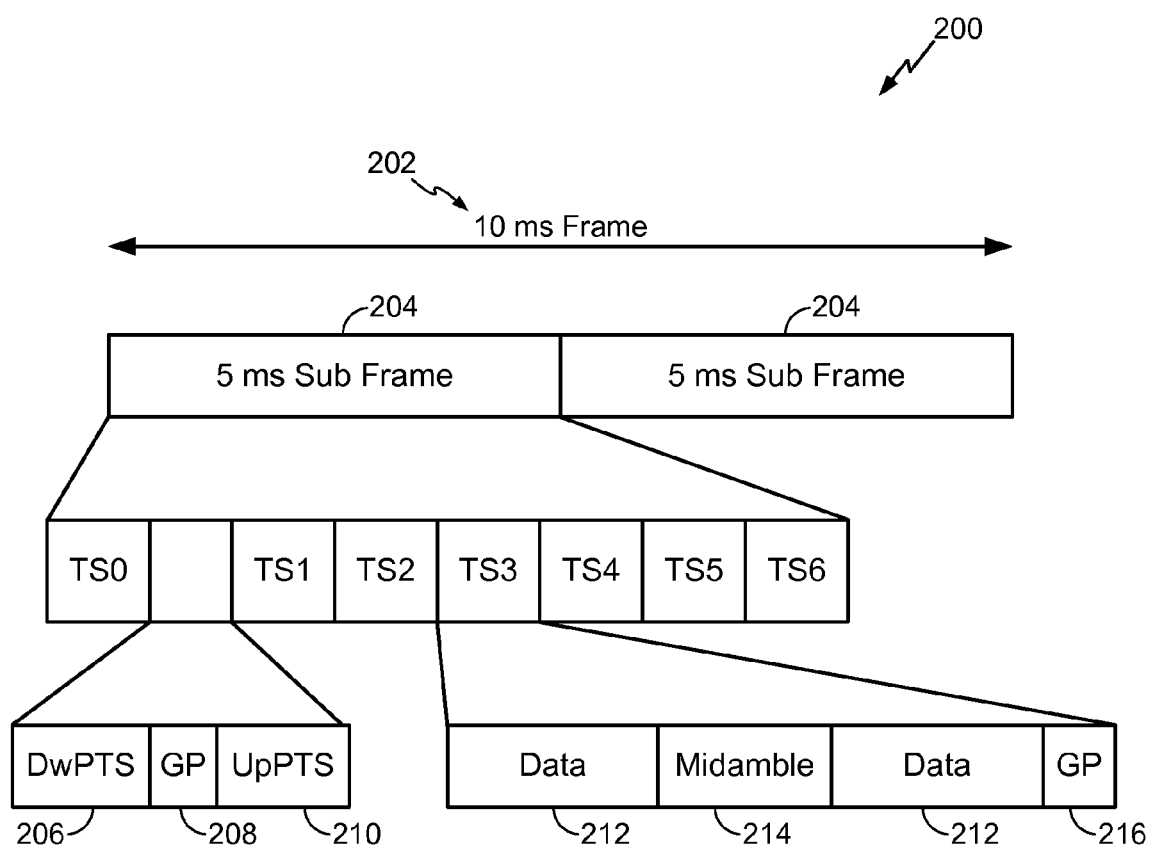
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 (also referred to herein as the downlink pilot channel (DwPCH)), a guard period (GP) 208, and an uplink pilot time slot (UpPTS) 210 (also referred to herein as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
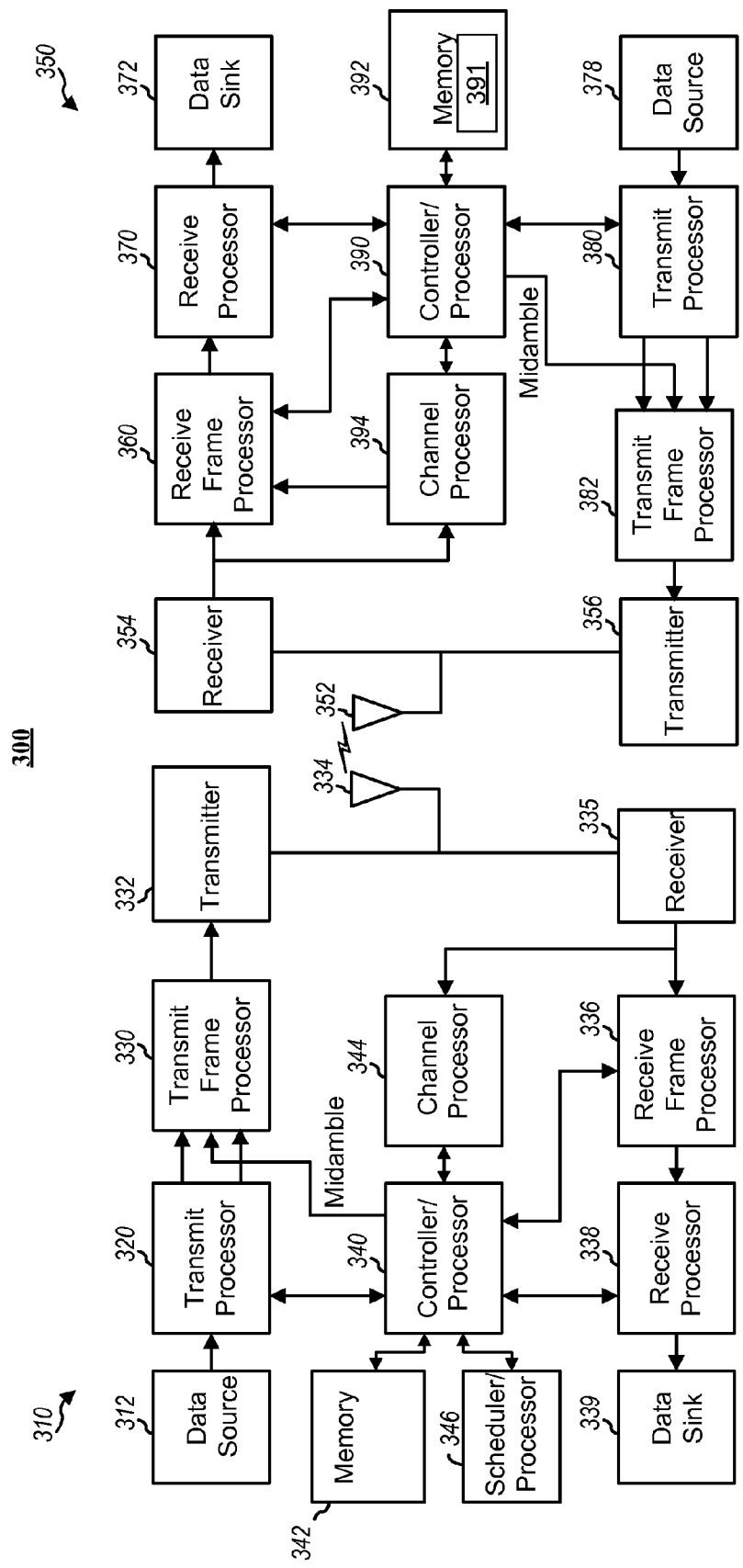
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a special burst detecting module 391 which, when executed by the controller/processor 390, configures the UE as indicated below. A scheduler/processor 346 at the node B 310 may be used to allocate resources to the UEs and schedule downlink and/or uplink transmissions for the UEs.

Joint Special Burst and Transport Format Combination Index (TFCI) Detection

In wireless communication systems, such as time division synchronous code division multiple access (TD-SCDMA) systems, time is partitioned into transmission time intervals (TTIs) that are subdivided into frames, which are further subdivided into timeslots. A TTI is defined as one or more radio frames. A collection of one or more sets of timeslots and codes are mapped according to a Coded Composite Transport Channel (CCTrCH). The Coded Composite Transport Channel includes one or more Transport Channels (TrCHs). When the maximum data size of a Coded Composite Transport Channel is transmitted, all allocated codes and timeslots are used in the TTI. The actual number of codes and timeslots transmitted during a TTI are signaled to the receiver via a Transport Format Combination Index (TFCI). Codes and timeslots are allocated according to a set of rules known to both the transmitter and receiver, so once the number of codes and timeslots are known to the receiver by decoding the TFCI, the receiver also knows which codes were transmitted in each timeslot.

A time division based system supports a transmission of radio frames (e.g., discontinuous transmission) when the total bit rate of a Coded Composite Transport Channel is less than the total bit rate of the codes and timeslots allocated to the Coded Composite Transport Channel within a TTI. During the discontinuous transmission, a time division transmitter transmits a special burst bit sequence (e.g., '0101 . . . ') to indicate the discontinuity in transmission. Within each radio frame, a special burst sequence (also called a special burst) may be specified based on whether there is data to transmit. Each special burst is identified by a 0-valued TFCI in a first code of a first timeslot allocated to the Coded Composite Transport Channel. A first special burst may indicate the start of a discontinuous transmission. Subsequent special bursts are transmitted periodically. The subsequent special bursts provide a mechanism for the receiver to determine that the Coded Composite Transport Channel is still active (albeit with no data to transmit), and prevent the receiver from dropping communications, such as by declaring out-of-synchronization.

An implementation for detecting a special burst during a discontinuous transmission may be on a per radio frame basis. Detecting a special burst is desirable to reduce false alarms associated with failure to distinguish transmission of data from transmission of the special burst. In one configuration, a transmitter transmits the special burst sequence in a physical channel with a lowest physical channel sequence number of the Coded Composite Transport Channel allocation. The special burst is transmitted with lower power than data.

The special burst may be detected based on a cross correlation between a received signal and the expected special burst sequence (i.e., '0101 . . . ') and a noise variance estimate of the signal. The correlation can be a distribution that is typically Gaussian. Cross correlating the signal with the special burst sequence can imply cross correlating the signal with (1, −1) such that noise is implemented in one domain and the signal is implemented in a second domain. In one aspect of the disclosure, the cross correlation between the signal and the special burst may be represented by summing up a real and imaginary component of the signal to obtain the cross correlation as illustrated in the following equations.

Equation 1 below shows the received signal y, which is the sum of a transmitted signal x and a noise element $n_i$; $N_{SB}$ is an integer representing a number of 45 degree rotated QPSK symbols in a special burst.

$$y_i = x_i + n_i \; i=1, \ldots, N_{SB} \quad \text{Equation 1}$$

Once the signal is received, a cross correlation, C, is determined as shown below in Equation 2:

$$C = \sum_{i=1}^{N_{SB}} y_{i,I} \quad \text{Equation 2}$$

where $y_{i,I}$ is a real component of the received signal $y_i$, $y_{i,Q}$ is an imaginary component of the received signal $y_i$, and the real components are summed through the special burst. As noted, the special burst may be detected based on a cross correlation between the signal and the special burst sequence (i.e., '0101 . . . ') and a noise variance estimate of the signal. The noise variance of the signal ($\sigma^2$) may be estimated as shown in Equation 3:

$$\sigma^2 = \sum_{i=1}^{N_{SB}} y_{i,Q}^2 \quad \text{Equation 3}$$

As illustrated, the noise component is identified separately such that the transmitted signal may be projected into a real and imaginary axis. For example, the real axis corresponds to the signal (or corresponds to the square root of the signal energy) and the imaginary axis corresponds to the noise. In one aspect of the disclosure, to detect a special burst sequence, the cross correlation (C) is compared to the square root of the estimated noise variance ($\sigma$) in conjunction with a threshold value (Th). In this configuration, the special burst sequence is detected when the cross correlation is greater than or equal to a product of the square root of the noise variance estimate and a threshold value (i.e., $C \geq \sigma \cdot Th$). Otherwise, no special burst sequence is detected.

In one aspect of the disclosure, the threshold value may include multiple threshold values. The multiple threshold values may be compared to an intensity or level of a special burst metric ($C/\sigma$) to facilitate determination of the special burst sequence. For example, when a special burst metric $C/\sigma$ is greater than a second threshold value ($Th_2$) it may be determined that a special burst sequence exists. However, when the special burst metric $C/\sigma$ is greater than a first threshold value (Th$_1$), but less than the second threshold metric (Th$_2$), it may be determined that detection of a special burst is unclear. In this case, a TFCI value may be used to confirm whether a special burst is detected. When the TFCI indicates a special burst was transmitted (e.g., TFCI=0) and the special burst metric C/σ is greater than the first threshold value (Th$_1$) then it is decided that a special burst sequence exists. Otherwise, it is decided that no special burst sequence was received and the TFCI is decoded based on a valid set of TFCIs. In this configuration, a code word or TFCI with a highest metric may be selected.

Figure 4:
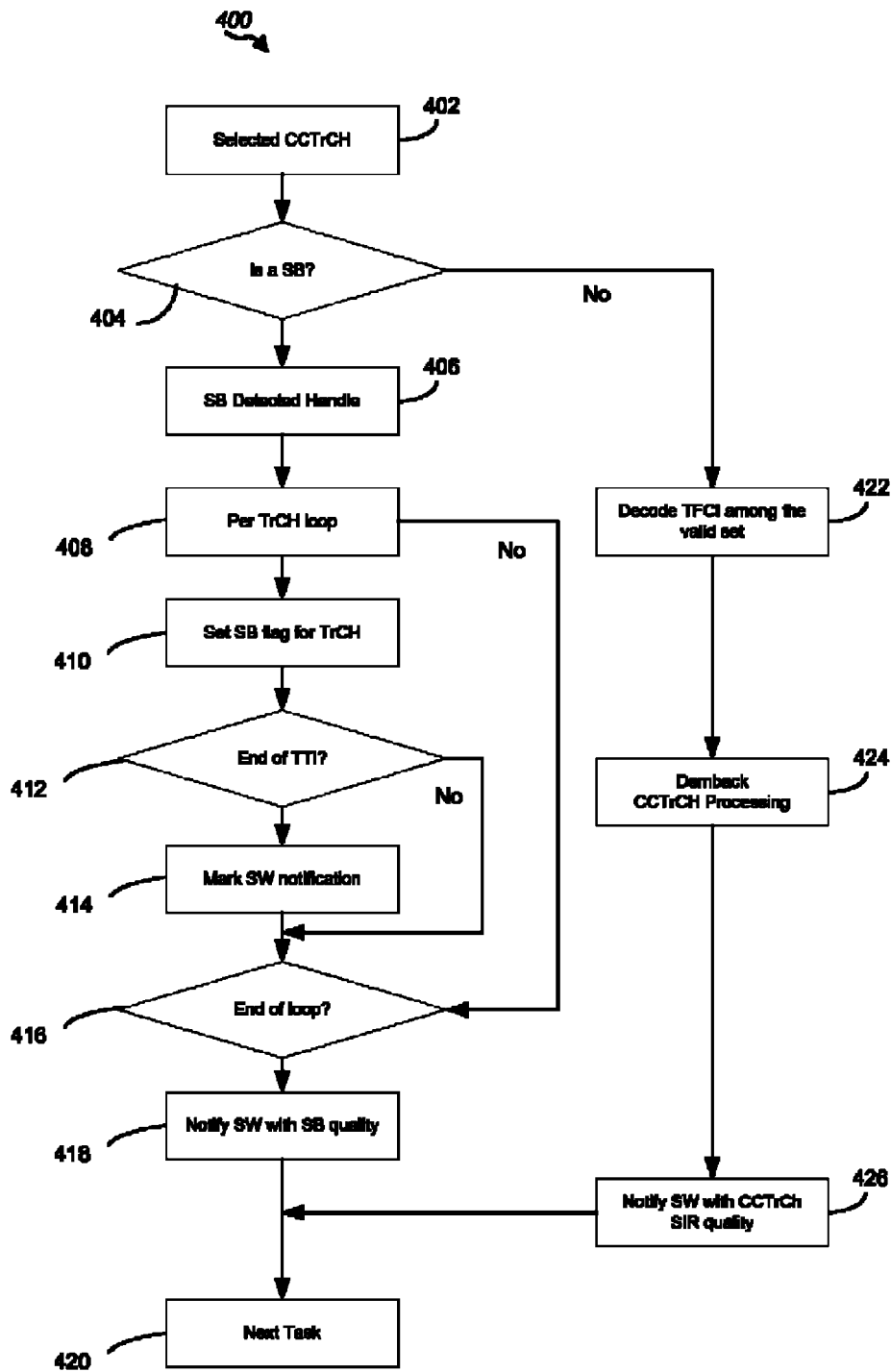
FIG. 4 is a flow diagram conceptually illustrating a joint special burst and transport format combination index detection configured according to one aspect of the present disclosure.

FIG. 4 is a flow diagram 400 conceptually illustrating exemplary joint special burst and TFCI detection configured according to one aspect of the present disclosure. This process may be executed in firmware, software, hardware, or a combination thereof. In block 402, a Coded Composite Transport Channel including one or more transport channels (TrCHs) is selected or identified. In block 404, it is determined whether a special burst sequence is detected in the Coded Composite Transport Channel. (This process is described in further detail below in the discussion of FIG. 5.) When it is determined that a special burst sequence is not detected in block 404, the system continues to block 422 where a TFCI is decoded among a valid set of TFCI. Non-zero valid TFCI indicates the presence of one or more transport channels in the Coded Composite Transport Channel. In block 424 Demback Coded Composite Transport Channel processing generates log-likelihood-ratio for the received bits, performs de-interleaving, de-rate-matching (de-puncturing and/or de-repetition) and decoding. In block 426, the software (SW) is notified of a Coded Composite Transport Channel signal to interference (SIR) quality and the flow process continues to a next task in block 420.

When it is determined that a special burst sequence is detected in block 404, the system continues to block 406 where the special burst sequence is processed. In block 408 a transport channel loop is initiated on a per transport channel basis. In block 410, a special burst flag is set for the transport channel. In block 412, it is determined whether the transmission time interval has ended. When it is determined that the transmission time interval has ended, a software (SW) notification is triggered and an end of loop check is made in block 416. Otherwise, when it is determined that the transmission time interval is not finished in block 412, the flow process bypasses block 414 and continues to block 416 to determine whether the loop is finished. When it is determined that the loop is finished, the software is notified of the quality of the special burst sequence in block 418 and the flow process continues to a next task in block 420. Otherwise, the loop continues by returning to block 408.

Figure 5:
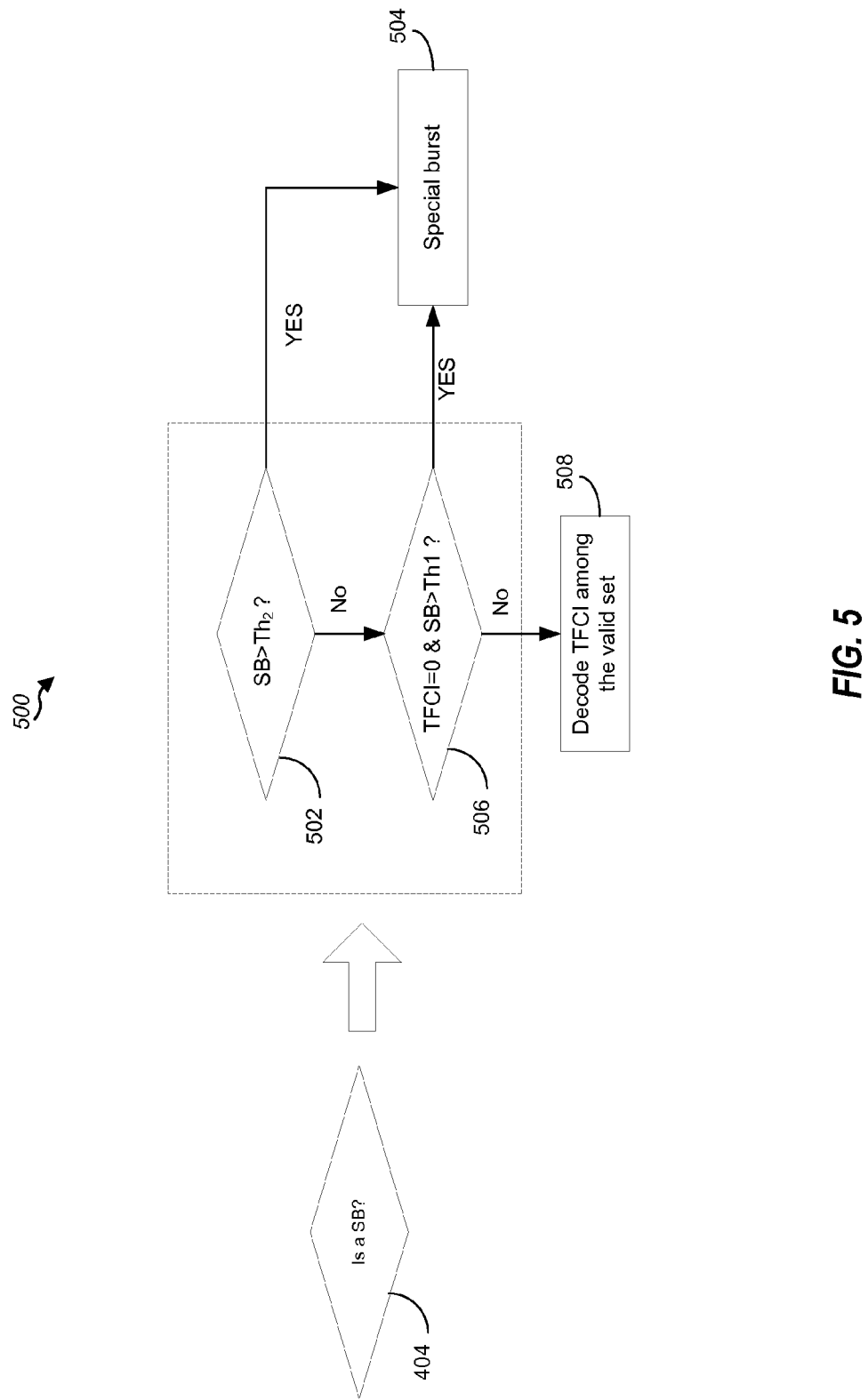
FIG. 5 is a flow diagram conceptually illustrating special burst detection according to one aspect of the present disclosure.

FIG. 5 is a flow diagram 500 conceptually illustrating a joint special burst and TFCI implementation for detecting a special burst sequence according to one aspect of the present disclosure. In one aspect of the disclosure, the flow diagram 500 can be implemented in block 404 of FIG. 4 to determine whether a special burst sequence exists. In block 502, it is determined whether a special burst metric (C/σ) is greater than a second threshold value (Th$_2$). When the special burst metric is greater than a second threshold value (Th$_2$) it is indicated in block 504 that a special burst sequence exists. Otherwise, when the special burst metric is less than a second threshold value (Th$_2$) the flow process continues to block 506. In block 506, it is determined whether the special burst metric C/σ is greater than a first threshold value (Th$_1$) and whether the TFCI value is equal to zero. When the special burst metric is greater than a first threshold value (Th$_1$) and the TFCI value is equal to zero it is indicated in block 504 that a special burst sequence exists. Otherwise, it is determined that no special burst sequence exists and the TFCI is decoded according to a valid set of TFCI in block 508.

Figure 6:
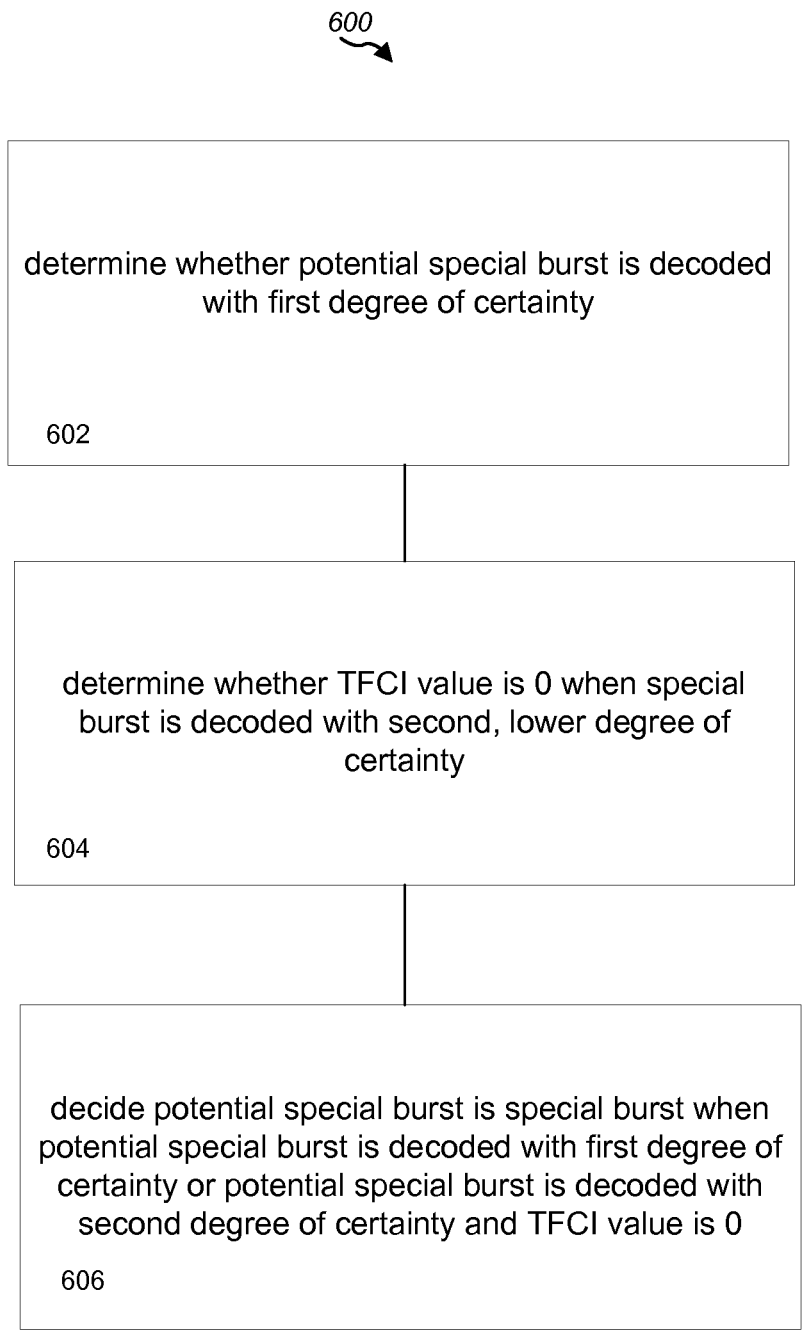
FIG. 6 shows a method of special burst detection according to some aspects of the disclosure.

FIG. 6 shows a wireless communication method 600 according to one aspect of the disclosure. The method begins in block 602 where it is determined whether a potential special burst is decoded with a first degree of certainty. In block 604, it is determined whether a TFCI value is 0 when the special burst is not decoded with the first degree of certainty but is decoded with a second, lower degree of certainty. In block 606, it is decided that the potential special burst is a special burst when either the potential special burst is decoded with the first degree of certainty or the potential special burst is decoded with the second degree of certainty and the TFCI value is determined to be 0.

Figure 7:
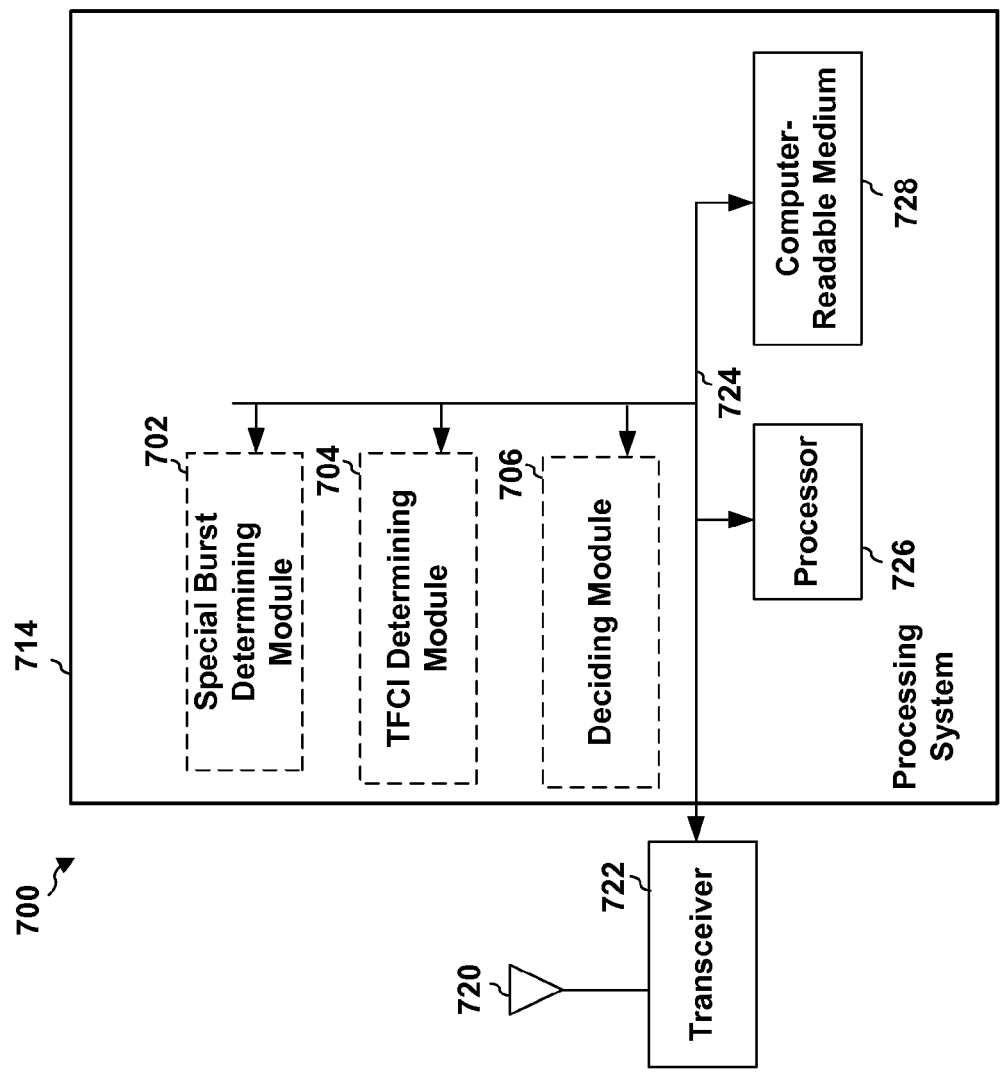
FIG. 7 is a block diagram illustrating components for special burst detection according to one aspect of the present disclosure.

FIG. 7 is a diagram illustrating an example of a hardware implementation for an apparatus 700 employing a joint special burst and TFCI detection system 714. The joint special burst and TFCI detection system 714 may be implemented with a bus architecture, represented generally by a bus 724. The bus 724 may include any number of interconnecting buses and bridges depending on the specific application of the joint special burst and TFCI detection system 714 and the overall design constraints. The bus 724 links together various circuits including one or more processors and/or hardware modules, represented by a processor 726, a special burst determining module 702, a TFCI determining module 704 and a deciding module 706, and a computer-readable medium 728. The bus 724 may also link various other circuits such as timing sources, peripherals, voltage regulators, and power management circuits, which are well known in the art, and therefore, will not be described any further.

The apparatus includes the joint special burst and TFCI detection system 714 coupled to a transceiver 722. The transceiver 722 is coupled to one or more antennas 720. The transceiver 722 provides a means for communicating with various other apparatus over a transmission medium. The joint special burst and TFCI detection system 714 includes the processor 726 coupled to the computer-readable medium 728. The processor 726 is responsible for general processing, including the execution of software stored on the computer-readable medium 728. The software, when executed by the processor 726, causes the joint special burst and TFCI detection system 714 to perform the various functions described supra for any particular apparatus. The computer-readable medium 728 may also be used for storing data that is manipulated by the processor 726 when executing software. The joint special burst and TFCI detection system 714 further includes the special burst determining module 702 for determining whether a potential special burst is decoded with a first degree of certainty. The joint special burst and TFCI detection system 714 further includes the TFCI determining module 704 for determining whether a transport format combination index (TFCI) value is zero when the potential special burst is not decoded with the first degree of certainty but is decoded with a second, lower degree of certainty. The joint special burst and TFCI detection system 714 further includes the deciding module 706 for deciding the potential special burst is a special burst when either the potential special burst is decoded with the first degree of certainty or the potential special burst is decoded with the second, lower degree of certainty and also the TFCI value is determined to be zero. The special burst determining module 702, the TFCI determining module 704 and the deciding module 706 may be software modules running in the processor 726, resident/stored in the computer readable medium 728, one or more hardware modules coupled to the processor 726, or some combination thereof. The joint special burst and TFCI detection system 714 may be a component of the UE 350 and may include the memory 392 and/or the controller/processor 390.

In one configuration, the apparatus 700 for wireless communication includes means for determining and means for deciding. The means may be the special burst determining module 702, TFCI determining module 704, deciding module 706, UE 350, the special burst detecting module 391, the memory 392, the controller/processor 390, and/or the joint special burst and TFCI detection system 714 of the apparatus 700 configured to perform the functions recited by the measuring and recording means. In another aspect, the aforementioned means may be any module or any apparatus configured to perform the functions recited by the aforementioned means.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   determining whether a potential special burst is decoded with a first degree of certainty;
   determining whether a transport format combination index (TFCI) value is zero when the potential special burst is not decoded with the first degree of certainty but is decoded with a second, lower degree of certainty; and
   deciding the potential special burst is a special burst when either the potential special burst is decoded with the first degree of certainty or the potential special burst is decoded with the second, lower degree of certainty and also the TFCI value is determined to be zero.

2. The method of claim 1, further comprising:
   restricting candidate TFCI values to a valid set; and
   selecting a TFCI value with a highest metric from among the candidate TFCI values.

3. The method of claim 1, in which the deciding is according to a special burst metric based at least in part on a cross correlation of a signal with a special burst sequence and based on a noise variance estimate.

4. The method of claim 3, in which deciding further comprises deciding the potential special burst is a special burst when the special burst metric is greater than a second threshold value.

5. The method of claim 3, in which deciding further comprises deciding the potential special burst is a special burst when the special burst metric is greater than a first threshold value and the TFCI value is determined to be zero.

6. An apparatus for wireless communication, comprising:
   means for determining whether a potential special burst is decoded with a first degree of certainty;
   means for determining whether a transport format combination index (TFCI) value is zero when the potential special burst is not decoded with the first degree of certainty but is decoded with a second, lower degree of certainty; and means for deciding the potential special burst is a special burst when either the potential special burst is decoded with the first degree of certainty or the potential special burst is decoded with the second, lower degree of certainty and also the TFCI value is determined to be zero.

7. The apparatus of claim 6, further comprising:
means for restricting candidate TFCI values to a valid set; and
means for selecting a TFCI value with a highest metric from among the candidate TFCI values.

8. The apparatus of claim 6, in which the means for deciding further comprises means for deciding according to a special burst metric based at least in part on a cross correlation of a signal with a special burst sequence and based on a noise variance estimate.

9. The apparatus of claim 8, in which the means for deciding further comprises means for deciding the potential special burst is a special burst when the special burst metric is greater than a second threshold value.

10. The apparatus of claim 8, in which the means for deciding further comprises means for deciding the potential special burst is a special burst when the special burst metric is greater than a first threshold value and the TFCI value is determined to be zero.

11. A computer program product, comprising:
a non-transitory computer-readable medium having program code recorded thereon, the program code comprising:
program code to determine whether a potential special burst is decoded with a first degree of certainty;
program code to determine whether a transport format combination index (TFCI) value is zero when the potential special burst is not decoded with the first degree of certainty but is decoded with a second, lower degree of certainty; and
program code to decide the potential special burst is a special burst when either the potential special burst is decoded with the first degree of certainty or the potential special burst is decoded with the second, lower degree of certainty and also the TFCI value is determined to be zero.

12. The computer program product of claim 11, in which the program code further comprises:
program code to restrict candidate TFCI values to a valid set; and
program code to select a TFCI value with a highest metric from among the candidate TFCI values.

13. The computer program product of claim 11, in which the program code to decide further comprises program code to decide according to a special burst metric based on a cross correlation of a signal with a special burst sequence and based on a noise variance estimate.

14. The computer program product of claim 13, in which the program code to decide further comprises program code to decide the potential special burst is a special burst when the special burst metric is greater than a second threshold value.

15. The computer program product of claim 13, in which the program code to decide further comprises program code to decide the potential special burst is a special burst when the special burst metric is greater than a first threshold value and the TFCI value is determined to be zero.

16. An apparatus for communicating in a wireless network, comprising:
a memory; and
at least one processor coupled to the memory and configured:
to determine whether a potential special burst is decoded with a first degree of certainty;
to determine whether a transport format combination index (TFCI) value is zero when the potential special burst is not decoded with the first degree of certainty but is decoded with a second, lower degree of certainty; and
to decide the potential special burst is a special burst when either the potential special burst is decoded with the first degree of certainty or the potential special burst is decoded with the second, lower degree of certainty and also the TFCI value is determined to be zero.

17. The apparatus of claim 16, in which the at least one processor is further configured:
to restrict candidate TFCI values to a valid set; and
to select a TFCI value with a highest metric from among the candidate TFCI values.

18. The apparatus of claim 16, in which the at least one processor is further configured to decide according to a special burst metric based on a cross correlation of a signal with a special burst sequence and based on a noise variance estimate.

19. The apparatus of claim 18, in which the at least one processor is further configured to decide the potential special burst is a special burst when the special burst metric is greater than a second threshold value.

20. The apparatus of claim 18, in which the at least one processor is further configured to decide the potential special burst is a special burst when the special burst metric is greater than a first threshold value and the TFCI value is determined to be zero.

* * * * *